(12) United States Patent
Guo et al.

(10) Patent No.: US 8,133,552 B2
(45) Date of Patent: Mar. 13, 2012

(54) PRIMER COMPOSITION FOR CURED SILICON-CONTAINING SURFACE AND ITS USES

(75) Inventors: Shang-Hsin Guo, Taichung County (TW); Wen-Ching Tsay, Taichung (TW)

(73) Assignee: Great Eastern Resins Industrial Co., Ltd., Taichung (TW)

( * ) Notice: Subject to any disclaimer, the term of this patent is extended or adjusted under 35 U.S.C. 154(b) by 394 days.

(21) Appl. No.: 12/409,619

(22) Filed: Mar. 24, 2009

(65) Prior Publication Data

US 2010/0151144 A1 Jun. 17, 2010

(30) Foreign Application Priority Data

Dec. 12, 2008 (TW) ................................. 97148409 A

(51) Int. Cl.
*C08F 2/48* (2006.01)
(52) U.S. Cl. ........ 427/515; 427/299; 427/331; 427/508; 556/413; 556/436; 556/437
(58) Field of Classification Search .................. None
See application file for complete search history.

(56) References Cited

U.S. PATENT DOCUMENTS

| | | | |
|---|---|---|---|
| 4,067,844 A * | 1/1978 | Barron et al. ................. | 525/453 |
| 5,260,350 A | 11/1993 | Wright | |
| 5,368,941 A | 11/1994 | Blizzard et al. | |
| 5,374,483 A | 12/1994 | Wright | |
| 6,686,008 B1 | 2/2004 | Merlin et al. | |
| 6,921,623 B2 * | 7/2005 | Hanabata et al. .......... | 430/270.1 |
| 2004/0092640 A1 * | 5/2004 | Makino et al. ................. | 524/425 |
| 2008/0312401 A1 * | 12/2008 | Sato et al. ....................... | 528/31 |
| 2009/0200165 A1 * | 8/2009 | Sudor et al. ................... | 204/451 |

FOREIGN PATENT DOCUMENTS

| | | | |
|---|---|---|---|
| CA | 2069861 | * | 11/1993 |
| EP | 1352936 | * | 10/2003 |
| EP | 1 234 517 | | 6/2005 |
| JP | 7-18221 | | 1/1995 |
| TW | 565595 | | 12/2003 |

OTHER PUBLICATIONS

Machine-generated translation of EP 1359936 (1993).*
"Synthesis, Structure, and Bioactivity of pHEMA/SIO2 Hybrids Derived Through in Situ Sol-gel Process" authored by Luciani et al. and published in the Journal of Sol-Gel Science and Technology (2008) 46, 166-175.*
"Synthesis and Characterization of Water-soluble Silsesquioxane-Based Nanoparticles by Hydrolytic Condensation of Triethoxysilane Derived from 2-Hydroxyethyl Acrylate" authored by Mori et al. and published in Langmuir (2007) 23, 9014-9023.*

* cited by examiner

*Primary Examiner* — Marc Zimmer
(74) *Attorney, Agent, or Firm* — Patterson Thuente Christensen Pedersen, P.A.

(57) ABSTRACT

A primer composition for a cured silicon-containing surface and its uses are provided. The composition comprises a polar organic solvent, an acrylic monomer, and an amino-containing silane having a formula of $(R^1O)_x(R^2)_ySiR^3NHR^4$, wherein each $R^1$ independently represents H, $C_1$-$C_{12}$ hydrocarbonyl, or aryl, each $R^2$ independently represents H, O, $C_1$-$C_{12}$ hydrocarbonyl, or aryl, $R^3$ represents divalent $C_1$-$C_6$ hydrocarbonyl being substituted or unsubstituted with one or more aryl rings and the carbon atom chain of the hydrocarbonyl can be inserted with one or more aryl rings, $R^4$ represents H, $C_1$-$C_{12}$ hydrocarbonyl, amino-$C_1$-$C_{12}$ hydrocarbonyl, or phenylamino, and x is 0, 1, 2 or 3, y is 0, 1 or 2, and the sum of x and y is 3. The amount of the acrylic monomer ranges from about 0.01 wt % to about 25 wt %, while the amount of the amino-containing silane ranges from about 1 wt % to about 35 wt %, based on the total weight of the composition.

13 Claims, No Drawings

PRIMER COMPOSITION FOR CURED SILICON-CONTAINING SURFACE AND ITS USES

This application claims priority to Taiwan Patent Application No. 097148409 filed on Dec. 12, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a primer composition for a cured silicon-containing surface and its uses. In particular, the present invention relates to a primer composition for a cured silicone elastomer surface and its uses.

2. Descriptions of the Related Art

Currently, a lot of the commercial products use silicon-containing materials, in which the silicone elastomer is one of the widely used materials. The silicone elastomer is generally applied on various fields, such as insulation tubes of electric equipments, pacifiers, injection pipes, drying agents, dust shields, components of food producing machines, soft molds used in industries, adhesives, sealing gels for glass or aluminum doors and windows, and the like. The silicone elastomer, also known as polymerized siloxane, is substantially composed of organic monomers and inorganic monomers. Its chemical formula is $[R_2SiO]_n$, in which each R independently represents methyl, ethyl, or phenyl.

The cured silicon elastomer has properties of stability (low reactivity), low toxicity, weatherability, water resistance, acid and alkali resistance, and electrical specification and is not easily yellowed or brittled by the irradiation of the UV light. Therefore, the cured silicone elastomer has been widely used in many industries. In particular, the cured silicone elastomer has became an important material in the biotechnical and cosmetic industries, such as medical pipes, artificial cartilages, artificial chins, artificial breasts, and replicas used in odontology.

The cured silicone elastomer can usually be classified into two types: liquid silicone elastomer and solid silicone elastomer. The liquid silicone elastomer, also known as room temperature vulcanization (RTV) silicon elastomer, is produced primarily by performing a condensation of the silane monomers through the moisture in the air at room temperature. The solid silicone elastomer, also known as high temperature vulcanization (HTV) silicone elastomer, is vulcanized primarily in two manners. The first manner is the addition vulcanization, which performs a crosslinking reaction of the silane monomers to form a polymer in the presence of a catalyst such as platinum. The second manner is the radical vulcanization, which induces a polymerization through the radicals of peroxides at a high temperature and vacuum to form a polymer of silicone elastomer.

There are only few functional groups in the cured silicone elastomer and most functional groups are C—H single bonds. The surface free energy of the cured silicone elastomer is relatively low, and therefore, the adhesive cannot be easily adhered thereon. It is hard to bond the cured silicone elastomer with other materials using an adhesive. In the past, the cured silicone elastomer has been fixed on other materials mainly via stitching. Using this manner, however, holes will be produced on the cured silicone elastomer, and thus destroys its structure and influences the overall look. The reactive silicone elastomer hot glue (product name: HM-2500) produced by Dow Corning Company is used to attach the cured silicone elastomer. However, the bonding effect provided by HM-2500 hot glue for the cured silicone elastomer cannot be well satisfied and will decrease over time.

Given the above, although the cured silicone elastomer itself has excellent properties such as weatherability, water resistance, acid and alkali resistance and the like, its poor adhesion effect of the adhesive will greatly decrease its practicability. There is a need for effectively attaching a cured silicone elastomer on other materials to improve the applicability of the cured silicon elastomer. Therefore, the subject invention provides a primer composition for improving an adhesion of an adhesive to a cured silicon-containing surface to improve the availability of the cured silicon-containing material.

SUMMARY OF THE INVENTION

One objective of the subject invention is to provide a primer composition for a cured silicon-containing surface, comprising a polar organic solvent, an acrylic monomer, and an amino-containing silane having a formula of $(R^1O)_x(R^2)_y SiR^3NHR^4$.

Another objective of the subject invention is to provide a method for improving an adhesion of an adhesive to a cured silicon-containing surface, comprising applying the primer composition of the subject invention to the surface.

The detailed technology and preferred embodiments implemented for the subject invention are described in the following paragraphs so that people skilled in this field can well appreciate the features of the subject invention.

BRIEF DESCRIPTION OF THE DRAWINGS

No figures.

DESCRIPTION OF THE PREFERRED EMBODIMENT

The primer composition of the subject invention comprises a polar organic solvent, an acrylic monomer, and an amino-containing silane having a formula of $(R^1O)_x(R^2)_y SiR^3NHR^4$. For the formula $(R^1O)_x(R^2)_y SiR^3NHR^4$ of the amino-containing silane, each $R^1$ independently represents H, $C_1$-$C_{12}$ hydrocarbonyl, or aryl, preferably $C_1$-$C_6$ alkyl;

each $R^2$ independently represents H, O, $C_1$-$C_{12}$ hydrocarbonyl, or aryl, preferably $C_1$-$C_6$ alkyl;

$R^3$ represents divalent $C_1$-$C_6$ hydrocarbonyl being substituted or unsubstituted with one or more aryl rings and the carbon atom chain of the hydrocarbonyl can be inserted with one or more aryl rings, and $R^3$ preferably represents $C_1$-$C_6$ alkylene being unsubstituted or not inserted with aryl rings;

$R^4$ represents H, $C_1$-$C_{12}$ hydrocarbonyl, amino-$C_1$-$C_{12}$ hydrocarbonyl, or phenylamino, preferably H, $C_1$-$C_6$ alkyl, or amino-$C_1$-$C_6$ alkyl; and x is 0, 1, 2 or 3, y is 0, 1 or 2, and the sum of x and y is 3.

According to one embodiment of the inventive composition for the amino-containing silane, $R^1$ independently represents $C_1$-$C_4$ alkyl, $R^3$ represents $C_1$-$C_4$ alkylene, $R^4$ represents H, $C_1$-$C_4$ alkyl or amino-$C_1$-$C_4$ alkyl, and x is 3. In another preferred embodiment, each $R^1$ independently represents methyl or ethyl, $R^3$ represents propylene, and $R^4$ represents H, butyl or amino-ethyl in the formula $(R^1O)_x(R^2)_y$ $SiR^3NHR^4$.

For example, the amino-containing silane useful in the composition of the subject invention may be selected from a group consisting of N-(n-butyl)-3-aminopropyltrimethoxysilane, N-(n-butyl)-3-aminopropyl-triethoxysilane, 3-aminopropyltrimethoxysilane, 3-aminopropyltriethoxysilane, N-(2-aminoethyl)-3-aminopropyltrimethoxysilane, N-(2-aminoethyl)-3-aminopropyltriethoxysilane, 3-aminopropyl-methyldiethoxysilane, and combinations thereof. Preferably, the amino-containing silane is selected from a group consisting of N-(n-butyl)-3-aminopropyltrimethoxysilane, 3-aminopropyltriethoxysilane, N-(2-aminoethyl)-3-aminopropyltrimethoxysilane, and combinations thereof, but not limited thereto.

The amount of the amino-containing silane typically ranges from about 1 wt % to about 35 wt %, preferably from about 5 wt % to about 25 wt %, and more preferably from about 10 wt % to about 20 wt %, based on the total weight of the composition. If the amount of the amino-containing silane is too large, the viscosity of the prepared composition may be excessively high. As a result, it is difficult to perform a coating step with the composition of such a high viscosity. Furthermore, the high viscosity may result in a non-uniform adhesion between the coated surface and the adhesive. If too small, the desired effect of improving the adhesion of the adhesive to the surface cannot be achieved.

In addition to the amino-containing silane, the primer composition of the subject invention further comprises an acrylic monomer. For example, the acrylic monomer useful in the composition of the subject invention may be selected from a group consisting of hydroxymethyl acrylate, hydroxymethyl methacrylate, hydroxyethyl acrylate, hydroxyethyl methacrylate, hydroxypropyl acrylate, hydroxypropyl methacrylate, glycidyl acrylate, glycidyl methacrylate, dimethylaminoethyl acrylate, dimethylaminoethyl methacrylate, tert-butylamino-methacrylate, acrylamide, methacrylamide, N-methylol-methacrylamide, and combinations thereof. Preferably, the composition of the subject invention uses an acrylic monomer containing hydroxyl. For example, the acrylic monomer containing hydroxyl may be selected from a group consisting of hydroxymethyl acrylate, hydroxymethyl methacrylate, hydroxyethyl acrylate, hydroxyethyl methacrylate, hydroxypropyl acrylate, hydroxypropyl methacrylate, and combinations thereof.

In the composition of the subject invention, the amount of the acrylic monomer typically ranges from about 0.01 wt % to about 25 wt %, preferably from about 3 wt % to about 15 wt %, and more preferably from about 5 wt % to about 10 wt %, based on the total weight of the composition.

The composition of the subject invention also comprises a polar organic solvent which substantially composes a balance portion of the composition. The polar organic solvent useful in the composition of the subject invention may be selected from a group consisting of ethyl acetate, methyl ethyl ketone, propylene glycol methyl ether, cyclohexanone, acetone, ethanol, methanol, isopropanol, methyl siloxanes (such as hexamethyl disiloxane, octamethyl trisiloxane, decamethyl tetrasiloxane), and combinations thereof, and combinations thereof. The polar organic solvent is preferably selected from a group consisting of ethyl acetate, methyl ethyl ketone, hexamethyl disiloxane, octamethyl trisiloxane, decamethyl tetrasiloxane, and combinations thereof. The composition of the subject invention can optionally comprise a non-polar organic solvent selected from a group consisting of toluene, xylene, methyl cyclohexane, hexane, cyclohexane and combinations thereof, and preferably toluene.

It is well known that when attaching two surfaces to improve the bonding effect, a pretreatment step is optionally performed before applying an adhesive to the surface to be attached to improve the adhesion effect between the surface and the adhesive. For example, the surface to be attached may be wiped with liquids such as alcohol or rubbed with sand papers to clean, erode and/or destroy the microstructure of the surface. This can enlarge the contact area between the surface and the adhesive. Alternatively, the surface to be attached may be soaked in or applied with a suitable solvent to improve its wettability, which is advantageous for the adhesion of the adhesive on the surface. Furthermore, providing functional groups on the surface to be attached improves the adhesion strength between the surface and the adhesive through the reactive chemical bonding. The inventors of the subject application found that the composition of the subject invention containing specific components and proportions can increase the wettability of the cured silicon-containing surface and provide functional groups thereon, thereby improving the adhesion of the adhesive to the cured silicon-containing surface.

Without being bound by theory, it is believed that in the composition of the subject invention, the amino group of the amino-containing silane may react with the functional group of the acrylic monomer. The resulting coating layer may form a chemical bond with various adhesives, such as polyurethane adhesive (PU adhesive). Besides, it is believed that the presence of the acrylic monomer can also improve the initial adhesion between the cured silicon-containing surface that is coated and the adhesive, which is advantageous to the attaching operation. Furthermore, the silicon-containing functional group of the amino-containing silane also exhibits a good affinity to the cured silicon-containing surface. Therefore, the composition of the subject invention comprises both the amino-containing silane and the acrylic monomer that facilitates improving the adhesion of the adhesive to the cured silicon-containing surface.

As stated before, the composition of the subject invention has an affinity to the cured silicon-containing surface and can form a chemical bond with the adhesive. The composition of the subject invention thus can be used as a primer composition which is applied to a cured silicon-containing surface to be attached before coating an adhesive on the surface to improve the adhesion of the adhesive to the cured silicon-containing surface. The material of the cured silicon-containing surface may be selected from a group consisting of glass, glass fiber, silicone elastomer, and combinations thereof. In one preferred embodiment of the subject invention, the primer composition is applied to the cured silicone elastomer surface.

When applying the composition of the subject invention to the cured silicon-containing surface, the surface may be optionally irradiated with an ultraviolet light (UV light). The high energy of the UV light renders the oxygen gas in the atmosphere to form an oxygen radical and destroys the polymer structure of the cured silicon-containing surface. Thus, the radiation of the UV light can destroy the polymer structure of the cured silicon-containing surface and will also graft a portion of the oxygen radicals from the oxygen gas onto the destroyed polymer to form functional groups to improve the adhesion between the silicon-containing surface and the adhesive.

For example, when applying the composition of the subject invention to a cured silicone elastomer surface, when using the UV light to irradiate the cured silicon elastomer surface which has been coated with the composition of the subject invention, it is possible to break the silane double bond in the cured silicone elastomer, and therefore, the oxygen radical form by the UV light may be grafted thereon to form a silanol group. The amino-containing silane is hydrolyzed through the moisture in the air, and then conducts condensation reaction with the silanol group on the surface for graft reaction. Besides, the amino group in the amino-containing silane will react with the acrylic monomer to form a surface coating layer which may form a chemical bond with various adhesives. It is known from the above description that the additional use of the UV light can assist the composition of the subject invention in improving the adhesion of the adhesive to the cured silicone elastomer surface.

The wavelength of the UV light used in the subject invention is typically controlled in a range from about 130 nm to about 200 nm, and the UV light has an energy of at least about 15 mW/cm$^2$, such as a UV$_c$ light. The related description for the use of the UV light can be referred to in EP 1 234 517 B1, which is incorporated herein as reference. The high energy UV light apparatus (product name: AS-3000) published by TACK SERVICE, Germany, in 2005 is an example of the commercially available UV light irradiation apparatus.

In the case of the combination use of the UV light irritation, the primer composition of the subject invention can optionally comprise a photoinitiator and a photostabilizer. The photoinitiator useful in the subject invention is not particularly limited and, for example, may be selected from a group consisting of 1-hydroxy cyclohexyl phenyl ketone, benzophenone, 2-hydroxy-2-methyl-1-phenyl-1-propanone, 2-hydroxy-1-[4-(2-hydroxyethoxy)-phenyl]-2-methyl-1-propanone, and combinations thereof. Preferably, the photoinitiator is selected from a group consisting of 1-hydroxy cyclohexyl phenyl ketone, benzophenone, and combinations thereof. Examples of the commercially available photoinitiator are IRGACURE 184, IRGACURE 500, IRGACURE 1173, IRGACURE 2925, and the like. The amount of the photoinitiator is typically not more than about 1 wt % and usually ranges from about 0.01 wt % to about 1 wt %, based on the total weight of the composition.

The photostabilizer useful in the subject invention is also not particularly limited and, for example, may be selected from any commercially available photostabilizer such as Chisorb 519, Chisorb 292, Chisorb 622LD, Chisorb 770, Chisorb 944, and the like. The amount of photostabilizer usually ranges from about 0 wt % to about 0.5 wt %, based on the total weight of the composition.

As described above, one embodiment of the composition of the subject invention is used to treat the cured silicone elastomer surface, such as a costume surface, a shoe surface, a label, and a decoration containing the cured silicone elastomer material. For example, a label of a cured silicon elastomer material is coated with a layer of the composition of the subject invention, followed by a suitable adhesive, to attach the label on a shoe surface. This not only can prevent the conventional damage of the stitch on the label of the cured silicone elastomer material, but also can provide a suitable bonding strength between the shoe surface and the cured silicone elastomer label, as well as an aesthetic appearance and convenient manufacturing process.

Therefore, the subject invention further relates to a method for improving an adhesion of an adhesive to a cured silicon-containing surface, comprising applying the composition of the subject invention to the surface. Any suitable methods may be used to apply the composition of the subject invention to the cured silicon-containing surface. For example, the subject invention may use the coating method selected from a group consisting of manual brushing, soaking, spraying, roller coating, and combinations thereof.

The cured silicon-containing surfaces which have been coated with the composition of the subject invention can exhibit great adhesion with various adhesives, and therefore may be attached with each other or surfaces of other materials through the adhesives. This may solve the problem that the cured silicon-containing surface cannot be attached effectively in the prior art. The other material may be any material that is desirably attached with the cured silicon-containing surface, and comprises, but is not limited to, polymer material such as poly(vinyl chloride) (PVC), ethylene-vinyl acetate (EVA), rubber, nylon, and the like.

The selection of the adhesive is not critical to the subject invention and its species is well known by people with ordinary skill in the art. The adhesive may be selected from an water based PU adhesive usually used in the attaching operation, a solvent based PU adhesive, a rubber-containing adhesive, a silicone elastomer adhesive, and combinations thereof. For example, if the cured silicone elastomer substrate is to be attached to the rubber substrate, the water based PU adhesive may be used as the adhesive.

The method of using the primer composition of the subject invention for attaching the cured silicon-containing surface substrate substantially comprises the following steps:

(1) applying the composition of the subject invention comprising the polar organic solvent, the acrylic monomer, the amino-containing silane, and the optional photoinitiator and photostabilizer to the cured silicon-containing surface;

(2) optionally irradiating the cured silicon-containing surface (which has been coated) with the UV light;

(3) applying an adhesive to the cured silicon-containing surface (which has been coated); and (4) attaching and pressing the cured silicon-containing surface (which has been coated with the adhesive) to another surface to be desirably attached.

In the above steps, the coating layer of the composition of the subject invention on the cured silicon-containing surface may also be dried after step (1) to remove the solvent in the composition. For example, the drying step may be performed by natural drying, using hot air, or placing the coated substrate in an oven. In addition, after step (3), the adhesive layer on the cured silicon-containing surface may be dried, and before attaching and pressing the cured silicon-containing surface with the adhesive layer thereon to another surface, an adhesive layer may be applied to the other surface. The adhesive applied to the cured silicon-containing surface may be identical with or different from that applied to the other surface. The combination selection of the adhesives can thereby provide a better bonding effect.

The time and the temperature of the above drying step vary with the species of the adhesive and the thickness of its coating layer. For example, if the PU adhesive is used and the thickness of the adhesive layer is about 0.2 mm, the drying temperature is normally about 50° C. to about 60° C. and the drying time is about 1 minute to about 3 minutes. In the case of using the UV light for the irradiation, the irradiating time is generally about 30 seconds to about 10 minutes and the irradiating height of the UV light is typically controlled in a range from about 2 cm to about 20 cm. The attaching process is preferably performed during 24 hours after the irradiation of the UV light. In addition to applying the primer composition of the subject invention to the cured silicon-containing surface and then irradiating the coated surface with the UV light as described above, the subject invention also covers the case of irradiating the cured silicon-containing surface with the UV light and then applying the composition of the subject invention to the irradiated surface to achieve the effect of improving the adhesion of the adhesive to the cured silicon-containing surface.

The embodiments below are illustrated to further describe the subject invention. However, the embodiments provided are intended for illustration, but not to limit the subject invention.

EXAMPLES

Preparation Examples 1 to 6

Each composition was prepared using the species of the components and the amounts listed in Table 1:

TABLE 1

| Component (wt %) | Preparation example 1 | Preparation example 2 | Preparation example 3 | Preparation example 4 | Preparation example 5 | Preparation example 6 |
|---|---|---|---|---|---|---|
| S1 | 20 | | | 20 | | |
| S2 | | 20 | | | 20 | |
| S3 | | | 20 | | | 20 |
| EAC | 70 | 68 | 68 | 25 | 25 | 25 |
| MEK | | | | 8 | 8 | 8 |
| TOL | | 2 | 2 | 2 | 2 | 2 |
| HEMA | 10 | 10 | 10 | 5 | 5 | 5 |
| IRGACURE 184 | | | | 0.1 | 0.1 | 0.1 |
| GRECO 302Si-1 | | | | 39.9 | 39.9 | 39.9 |

S1: Silane monomer, N-(n-butyl)-3-aminopropyltrimethoxysilane
S2: Silane monomer, 3-aminopropyltriethoxysilane
S3: Silane monomer, N-(2-aminoethyl)-3-aminopropyltrimethoxysilane
EAC: Solvent, ethyl acetate
MEK: Solvent, methyl ethyl ketone
TOL: Solvent, toluene
HEMA: Acrylic monomer, hydroxyethyl methacrylate
IGRACURE 184: Photoinitiator
GRECO 302Si-1: Solvent Subsequently, the following bonding test was performed with the use of the prepared compositions.

Example 7

After buffing the surfaces of several rubber substrates (vulcanized rubbers, commercially available from Zhen Tai Enterprise Co., Ltd) and applying a layer of the primer (GRECO 001 AB) used for the rubber thereon, the coated rubber substrates were dried at a temperature of 60° C. for 3 minutes. A layer of the water based PU adhesive containing 4 wt % of the hardener (GRECO 6608 with 4 wt % of 367S) was then applied. The resulting rubber substrates were dried at a temperature of 60° C. for 5 minutes.

The composition of Preparation example 1 was applied to each of the cured silicone elastomer surfaces of HTV (hardness: 30, 40, 50, and 70) and RTV (hardness: 40, 50, and 60) and the cured silicone elastomer surface with high tear strength (as shown in Table 2), and then, the coated surfaces were dried at a temperature of 60° C. for 3 minutes. Subsequently, a layer of the water based PU adhesive containing 4 wt % of the hardener (GRECO 6608 with 4 wt % of 367S) was applied to each of the surfaces, and the resulting silicon elastomers were dried at a temperature of 60° C. for 5 minutes.

The rubber substrates were attached and pressed with the cured silicon elastomers via the coated surfaces, and then, the resulting laminates were placed for 24 hours. The test for the bonding strength was conducted in accordance with ASTM D1876 method and the results were shown in Table 2.

The above procedure was repeated, but the compositions of Preparation examples 2 to 6 were respectively applied to the cured silicone elastomer surfaces. The results for the bonding test were also shown in Table 2.

TABLE 2

| | | The bonding strength without the UV light irradiation | | | | | |
|---|---|---|---|---|---|---|---|
| Hardness and species of silicone elastomer | | Preparation example 1 | Preparation example 2 | Preparation example 3 | Preparation example 4 | Preparation example 5 | Preparation example 6 |
| HTV | 30[1] | 1.6 | 0.6 | 0.8 | 0.2 | 0.6 | 0.6 |
| | 40[2] | 1.8 | 0.9 | 1 | 0.6 | 0.2 | 0.5 |
| | 50[3] | 0.5 | 0.4 | 0.7 | 0.6 | 0.2 | 0.4 |
| | 70[4] | 0.3 | 0.5 | 0.6 | 0.4 | 0.8 | 0.6 |
| RTV | 40[5] | 0.3 | 0.2 | 0.2 | 0.8 | 0.2 | 0.3 |
| | 50[6] | 0.6 | 0.4 | 1.2 | 0.5 | 0.4 | 0.4 |
| | 60[7] | 0.3 | 0.2 | 0.2 | 0.2 | 0.2 | 0.2 |
| Silicone elastomer with high tear strength[8] | | 1 | 0.7 | 2.4 | 0.9 | 0.7 | 0.8 |

The unit of the values: kg/cm
[1],[2],[3],[4]independently represent the products 931TU, 941U, 951U, and 971Ty of Li Tai Industry Co., Ltd.
[5],[6],[7]independently represent the products 40, 50N, and 1990-60 of Li Tai Industry Co., Ltd.
[8]is produced by Sun Print 3-D Label Enterprise Co., Ltd.

Example 8

The procedure described in Example 7 was repeated, but the silicone elastomer surfaces were irradiated with the UV light for 7 minutes (the irradiating height of the UV light: 8 cm) by using AS-3000 apparatus prior to applying the water based PU adhesive. The test results of the bonding strength were shown in Table 3.

TABLE 3

The bonding strength with the UV light irradiation

| Hardness and species of silicone elastomer | | Preparation example 1 | Preparation example 2 | Preparation example 3 | Preparation example 4 | Preparation example 5 | Preparation example 6 |
|---|---|---|---|---|---|---|---|
| HTV | 30[1] | 2.3* | 2.7 | 0.8 | 4.7* | 0.5* | 2.8* |
|  | 40[2] | 2.8* | 2.0 | 0.6 | 2.5* | 1.6* | 1.1 |
|  | 50[3] | 1.5 | 1.4* | 0.6 | 2.9* | 1.1* | 2.2* |
|  | 70[4] | 1.0* | 1.4* | 2.5 | 1.6* | 1.5* | 1.0* |
| RTV | 40[5] | 2.4* | 1.1* | 0.4 | 2.5* | 1.4* | 0.9 |
|  | 50[6] | 4.5 | 3.5 | 0.7 | 3.4* | 2.5* | 0.9 |
|  | 60[7] | 1.8* | 1.1* | 0.4 | 5.0* | 2.1* | 1.5* |
| Silicone elastomer with high tear strength[8] | | 4.2* | 2.1 | 1 | 5.2* | 4.5* | 1.5 |

The unit of the values: kg/cm
*represents that the cured silicone elastomer was broken (material failure)
[1],[2],[3],[4]independently represent the products 931TU, 941U, 951U, and 971Ty of Li Tai Industry Co., Ltd.
[5],[6],[7]independently represent the products 40, 50N, and 1990-60 of Li Tai Industry Co., Ltd.
[8]is produced by Sun Print 3-D Label Enterprise Co., Ltd.

As shown in Table 2 and Table 3, the primer composition of the subject invention can improve the adhesion between the cured silicone elastomer surface and the adhesive, and therefore, the cured silicone elastomer surface can be effectively attached to the rubber surface. In particular, the test results of the bonding strength with the UV light irradiation further show that the material failure phenomenon occurred in the cured silicone elastomer, and thus demonstrate a good bonding strength between the two substrates.

Comparative Example 9

The rubber substrates that will be attached were prepared according to the procedure described in Example 7. Subsequently, after applying HM2500 hot glue produced by Dow Corning Company to the cured silicone elastomer surfaces of HTV (hardness: 30) and RTV (hardness: 40) respectively, the cured silicone elastomer surfaces were attached with the prepared rubber substrates. After 24 hours, the test for the bonding strength was conducted in accordance with ASTM D1876 method. The test results were shown in Table 4.

TABLE 4

The bonding strength of the commercial products

| Hardness and species of silicone elastomer | | HM2500 |
|---|---|---|
| HTV | 30[1] | 0.5 |
| RTV | 40[5] | Attaching Failure |

[1]represents the product 931TU of Li Tai Industry Co., Ltd.
[5]represents the product 40 of Li Tai Industry Co., Ltd.

As shown in Table 4, when using the commercial product (HM2500) to treat the cured silicone elastomer surface before applying an adhesive, the effect for improving the adhesion of the adhesive to the surface is limited.

The above examples are exemplified to illustrate the principle and effects of the subject invention, but not to limit the subject invention. People skilled in this field may proceed with a variety of modifications and replacements to the above examples without departing from the technical principle and spirit of the subject invention. Therefore, the scope of the protection of the subject invention should be covered in the following claims as appended.

What is claimed is:

1. A primer composition for a cured silicon-containing surface, comprising:
    a polar organic solvent;
    an acrylic monomer selected from a group consisting of hydroxymethyl acrylate, hydroxymethyl methacrylate, hydroxyethyl acrylate, hydroxyethyl methacrylate, hydroxypropyl acrylate, hydroxypropyl methacrylate, and combinations thereof; and
    an amino-containing silane having a formula of $(R^{10})_x(R^2)_y SiR^3 NHR^4$, wherein each $R^1$ independently represents H, $C_1$-$C_{12}$ hydrocarbonyl, or aryl, each $R^2$ independently represents H, O, $C_1$-$C_{12}$ hydrocarbonyl, or aryl, $R^3$ represents divalent $C_1$-$C_6$ hydrocarbonyl being substituted or unsubstituted with one or more aryl rings and the carbon atom chain of the hydrocarbonyl can be inserted with one or more aryl rings, $R^4$ represents H, $C_1$-$C_{12}$ hydrocarbonyl, amino-$C_1$-$C_{12}$ hydrocarbonyl, or phenylamino, and x is 0, 1, 2 or 3, y is 0, 1 or 2, and the sum of x and y is 3;
    wherein the amount of the acrylic monomer ranges from about 0.01 wt % to about 25 wt % and the amount of the amino-containing silane ranges from about 1 wt % to about 35 wt %, based on the total weight of the composition.

2. The composition of claim 1, wherein each $R^1$ independently represents $C_1$-$C_6$ alkyl, each $R^2$ independently represents $C_1$-$C_6$ alkyl, $R^3$ represents $C_1$-$C_6$ alkylene, and $R^4$ represents H, $C_1$-$C_6$ alkyl or amino-$C_1$-$C_6$ alkyl.

3. The composition of claim 2, wherein each $R^1$ independently represents $C_1$-$C_4$ alkyl, $C_1$-$C_4$ alkylene, $R^4$ represents H, $C_1$-$C_4$ alkyl or amino-$C_1$-$C_4$ alkyl, and x is 3.

4. The composition of claim 3, wherein each $R^1$ independently represents methyl or ethyl, $R^3$ represents propylene, and $R^4$ represents H, butyl or amino-ethyl.

5. The composition of claim 1, wherein the amino-containing silane is selected from a group consisting of N-(n-butyl)-3-aminopropyltrimethoxysilane, N-(n-butyl)-3-aminopropyl-triethoxysilane, 3-aminopropyltrimethoxysilane, 3-aminopropyltriethoxysilane, N-(2-aminoethyl)-3-aminopropyltrimethoxysilane, N-(2-aminoethyl)-3-aminopropyltriethoxysilane, 3-aminopropylmethyldiethoxysilane, and combinations thereof.

6. The composition of claim 1, wherein the amount of the acrylic monomer ranges from about 3 wt % to about 15 wt % and the amount of the amino-containing silane ranges from about 5 wt % to about 25 wt %, based on the total weight of the composition.

7. The composition of claim 6, wherein the amount of the acrylic monomer ranges from about 5 wt % to about 10 wt % and the amount of the amino-containing silane ranges from about 10 wt % to about 20 wt %, based on the total weight of the composition.

8. The composition of claim 1, wherein the polar organic solvent is selected from a group consisting of ethyl acetate, methyl ethyl ketone, propylene glycol methyl ether, cyclohexanone, acetone, ethanol, methanol, isopropanol, methyl siloxanes, and combinations thereof; and the composition optionally comprises a non-polar organic solvent selected from a group consisting of toluene, xylene, methyl cyclohexane, hexane, cyclohexane and combinations thereof.

9. The composition of claim 8, wherein the polar organic solvent is selected from a group consisting of ethyl acetate, methyl ethyl ketone, hexamethyl disiloxane, octamethyl trisiloxane, decamethyl tetrasiloxane, and combinations thereof; and the non-polar organic solvent is toluene.

10. A method for improving an adhesion of an adhesive to a cured silicon-containing surface, comprising applying the composition of any one of claims 1 to 9 to the surface before applying the adhesive.

11. The method of claim 10, further comprising irradiating the surface with a UV light before or after applying the composition to the surface.

12. The method of claim 11, wherein the wave length of the UV light ranges from about 130 nm to about 200 nm.

13. The method of claim 10, further comprising a step of drying the coated surface after applying the composition to the surface.

* * * * *